United States Patent
Jiang et al.

(10) Patent No.: US 12,160,889 B2
(45) Date of Patent: Dec. 3, 2024

(54) UNLICENSED BAND INFORMATION TRANSMISSION METHOD, TERMINAL AND NETWORK DEVICE

(71) Applicant: VIVO MOBILE COMMUNICATION CO., LTD., Dongguan (CN)

(72) Inventors: Lei Jiang, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 510 days.

(21) Appl. No.: 17/385,946

(22) Filed: Jul. 27, 2021

(65) Prior Publication Data
US 2021/0378014 A1 Dec. 2, 2021

Related U.S. Application Data

(63) Continuation of application No. PCT/CN2020/070910, filed on Jan. 8, 2020.

(30) Foreign Application Priority Data

Feb. 2, 2019 (CN) .......................... 201910108016.7

(51) Int. Cl.
*H04W 74/0816* (2024.01)
*H04W 72/1268* (2023.01)
*H04W 72/23* (2023.01)
*H04W 74/00* (2009.01)

(52) U.S. Cl.
CPC ... *H04W 74/0816* (2013.01); *H04W 72/1268* (2013.01); *H04W 72/23* (2023.01); *H04W 74/002* (2013.01)

(58) Field of Classification Search
CPC ......... H04W 74/0816; H04W 72/1268; H04W 72/23; H04W 74/002; H04W 72/0446; H04W 74/08
See application file for complete search history.

(56) References Cited

U.S. PATENT DOCUMENTS

| | | | |
|---|---|---|---|
| 2017/0318607 A1* | 11/2017 | Tiirola | H04W 4/10 |
| 2017/0332358 A1 | 11/2017 | Park et al. | |
| 2018/0103458 A1* | 4/2018 | Tooher | H04W 72/23 |
| 2019/0387573 A1* | 12/2019 | Loehr | H04W 72/0446 |
| 2021/0314943 A1* | 10/2021 | Lunttila | H04W 72/0446 |
| 2022/0377683 A1* | 11/2022 | Myung | H04W 74/0816 |

FOREIGN PATENT DOCUMENTS

| | | |
|---|---|---|
| CN | 105992384 A | 10/2016 |
| CN | 107079494 A | 8/2017 |
| CN | 108370582 A | 8/2018 |

OTHER PUBLICATIONS

International Search Report issued in corresponding International Application No. PCT/CN2020/070910, mailed Mar. 19, 2020, 4 pages.

* cited by examiner

*Primary Examiner* — Omer S Mian
(74) *Attorney, Agent, or Firm* — IPX PLLC

(57) ABSTRACT

The disclosure provides an unlicensed band information transmission method, a terminal and a network device. The method includes: listening to a first transmission channel, where the first transmission channel adopts a first fixed frame period; and sending uplink information on the first transmission channel while detecting that the channel is idle.

14 Claims, 4 Drawing Sheets

UNLICENSED BAND INFORMATION TRANSMISSION METHOD, TERMINAL AND NETWORK DEVICE

CROSS-REFERENCE TO RELATED APPLICATIONS

This application is a bypass continuation of PCT Application No. PCT/CN2020/070910 filed Jan. 8, 2020, which claims priority to Chinese Patent Application No. 201910108016.7 filed on Feb. 2, 2019 in China, both of which are incorporated herein by reference in their entireties.

TECHNICAL FIELD

The present disclosure relates to the field of a communication technology, and in particular, relates to an unlicensed band information transmission method, a terminal and a network device.

BACKGROUND

In a mobile communication system, an unlicensed band may serve as a supplement to a licensed band to help an operator perform service capacity expansion. The unlicensed band is shared by a plurality of radio access technologies, therefore the unlicensed band must meet certain regulations when in use to ensure that all devices may use the resources fairly, such as listen before talk (LBT), maximum channel occupancy time (MCOT) and other regulations. While a transmission node needs to send information, LBT is performed firstly to perform energy detection (ED) on surrounding nodes. While the detected energy is lower than a threshold, a channel is regarded to be idle, and the transmission node may send the information. On the contrary, the channel is regarded to be busy, and the transmission node may not send the information. After the transmission node starts to transmit the information, channel occupancy time (COT) cannot exceed MCOT.

Frame based equipment (FBE) means that sending/receiving timing of the equipment adopts a periodic structure, and a period is a fixed frame period. An FBE node adopts an LBT-based channel access mechanism to occupy a channel, where a node for initiating a transmission sequence including one or a plurality of continuous transmission is referred to as an initiating device, and another node is referred to as a responding device. Further, before the start of the transmission at a starting moment of some fixed frame period, the initiating device performs LBT, namely, a clear channel assess (CCA). If the channel is judged to be idle, the information may be sent immediately; and if not, the information may not be sent within duration of the following fixed frame period. However, in the related technology, there is not a manner how the FBE equipment performs a configured grant transmission under an unlicensed band and a transmission solution while a time domain location of an uplink transmission resource is inconsistent with an initiating edge of a fixed frame.

SUMMARY

Embodiments of the present disclosure provide an unlicensed band information transmission method, a terminal and a network device, to resolve a problem of FBE information transmission under an unlicensed band.

According to a first aspect, an embodiment of the present disclosure provides an unlicensed band information transmission method, applied to a terminal side and including: listening to a first transmission channel, where the first transmission channel adopts a first fixed frame period; and sending uplink information on the first transmission channel while detecting that the channel is idle.

According to a second aspect, an embodiment of the present disclosure provides a terminal, including: a first listening module, configured to listen to a first transmission channel, the first transmission channel adopts a first fixed frame period, and a first sending module, configured to send uplink information on the first transmission channel while detecting that the channel is idle.

According to a third aspect, an embodiment of the present invention provides another terminal. The terminal includes a processor, a memory, a computer program that is stored in the memory and can run on the processor, and while the computer program is executed by the processor, the steps of the foregoing unlicensed band information transmission method are implemented.

According to a fourth aspect, an embodiment of the present disclosure provides an unlicensed band information transmission method, applied to a network device side and including: receiving uplink information on a first transmission channel, where the first transmission channel adopts a first fixed frame period.

According to a fifth aspect, an embodiment of the present disclosure provides a network device, including: a third receiving module, configured to receive uplink information on a first transmission channel, where the first transmission channel adopts a first fixed frame period.

According to a sixth aspect, an embodiment of the present disclosure further provides a network device. The network device includes a processor, a memory, a computer program that is stored in the memory and can run on the processor, and while the computer program is executed by the processor, the steps of the foregoing unlicensed band information transmission method are implemented.

According to a seventh aspect, an embodiment of the present disclosure provides a computer-readable storage medium, where the computer-readable storage medium stores a computer program, and while the computer program is executed by a processor, the steps of the foregoing unlicensed band information transmission method at a terminal side or a network device side are implemented.

In this way, the terminal in the embodiments of the present disclosure listens to the first transmission channel that adopts the first fixed frame period. While detecting that the channel is idle, information may be sent on the first transmission channel, so that the FBE equipment may perform information transmission on an unlicensed band.

BRIEF DESCRIPTION OF DRAWINGS

To better clarify the technical solution of the embodiments of the present disclosure, the accompanying drawings required to illustrate the embodiments of the present disclosure will be simply described below. Obviously, the accompanying drawings described below merely illustrate some embodiments of the present disclosure. Those ordinarily skilled in the art can obtain other accompanying drawings without creative labor on the basis of those accompanying drawings.

FIG. 11 is a schematic diagram of a module structure of a network device according to an embodiment of the present disclosure.

DETAILED DESCRIPTION

Figure 1:
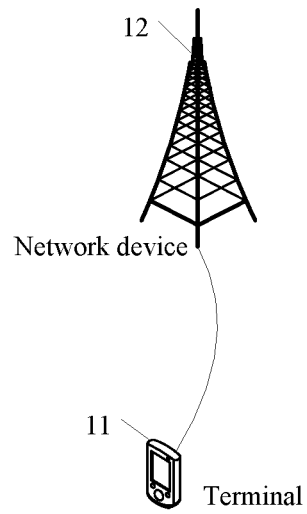
FIG. 1 is a block diagram of a mobile communication system applicable to an embodiment of the present disclosure.

The following clearly describes the exemplary embodiments of the present disclosure with reference to the accompanying drawings. Although the accompanying drawings show exemplary embodiments of the present disclosure, it should be understood that the present disclosure can be implemented in various forms and shall not be limited by embodiments described herein. On the contrary, providing these embodiments is to understand the present disclosure thoroughly, and the scope of the present disclosure can be completely conveyed to technicians in the art.

Terms "first" and "second" in the description and claims of this application are used to distinguish between similar objects, and do not need to be used to describe a specific order or sequence. It should be understood that the data termed in such a way is interchangeable in proper circumstances so that the embodiments of this application described herein can be implemented in an order other than the order illustrated or described herein. In addition, terms "include", "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. "And/or" used in the description and claims means at least one of the connected objects.

The technology described in this description is not limited to the long term evolution (LTE)/LTE-Advanced (LTE-A) system. It can also be applied in various wireless communication systems such as code division multiple access (CDMA), time division multiple access (TDMA), frequency division multiple access (FDMA), orthogonal frequency division multiple access (OFDMA), single-carrier frequency-division multiple access (SC-FDMA) and other systems. The terms "system" and "network" are usually used interchangeably. The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following description provides examples and does not limit the scope, applicability, or configuration set forth in the claims. Changes may be made to the function and arrangement of discussed elements without deviating from the spirit and scope of this present disclosure. In various examples, various procedures or components may be omitted, replaced, or added appropriately. For example, the described method may be executed based on a sequence different from the description, and various steps may be added, omitted or combined. In addition, features described with reference to some examples may be combined in other examples.

Referring to FIG. 1, FIG. 1 is a block diagram of a mobile communication system applicable to an embodiment of the present disclosure. The wireless communication system includes a terminal 11 and a network device 12. Where the terminal 11 may also be referred to as a terminal device or a user equipment (UE), and the terminal 11 may be a mobile phone, a tablet personal computer, a laptop computer, a personal digital assistant (PDA), a mobile internet device (MID), a wearable device, a vehicle-mounted device or other terminal side devices. It should be noted that a specific type of the terminal 11 is not limited in embodiments of the present disclosure. The network device 12 may be a base station or a core network, where the base station may be a base station of 5G or a later version (for example, gNB or 5G NR NB), or a base station in another communication system (for example, an eNB, a WLAN access point, or other access points). The base station may be referred to as a node B, an evolved node B, an access point, a base transceiver station (BTS), a radio base station, a radio transceiver, a basic service set (BSS), an extended service set (ESS), a node B, an evolved node B (eNB), a home node B, a home evolved node B, a WLAN access point, a WiFi node, or other appropriate terms in the art. As long as a same technical effect is achieved, the base station is not limited to a specified technical term. It should be noted that, in embodiments of the present disclosure, only a base station in the NR system is used as an example, but a specific type of the base station is not limited.

The base station can communicate with the terminal 11 under the control of a base station controller. In various examples, the base station controller may be a part of the core network or some base stations. Some base stations may perform communication with control information or user data through backhaul and a core network. In some examples, some of the base stations may be directly or indirectly communicated with each other by a backhaul link, and the backhaul link may be a wired or wireless communication link. A wireless communication system may support operations on a plurality of carriers (wave signals with different frequencies). A multi-carrier transmitter can simultaneously transmit a modulated signal on the plurality of carriers. For example, each communication link may be a multi-carrier signal modulated based on various radio technologies. Each modulated signal can be sent over different carriers and can carry control information (for example, a reference signal or a control channel), overhead information, data, and the like.

The base station can perform a wireless communication with the terminal 11 through one or more access point antennas. Each base station may provide communication overlay to a corresponding coverage area of the base station. A coverage area of an access point may be divided into sectors that form merely a part of the coverage area. The wireless communication system may include different types of base stations (for example, a macro base station, a micro base station, or a pico base station). The base station may also use different radio technologies, such as cellular or WLAN radio access technologies. The base station may be associated with the same or different access networks or operator deployment. Coverage areas of different base stations (including coverage areas of base stations of the same or different types, coverage areas using the same or different radio technologies, or coverage areas belonging to the same or different access networks) may overlap.

A communication link in the wireless communication system may include an uplink for carrying uplink (UL) transmission (for example, from the terminal 11 to the network device 12), or a downlink for carrying downlink (DL) transmission (for example, from the network device 12 to the terminal 11). The UL transmission may also be referred to as reverse link transmission, and the DL transmission may also be referred to as forward link transmission. The downlink transmission may be performed in a licensed band, an unlicensed band, or both. Similarly, the uplink transmission may be performed in a licensed band, an unlicensed band, or both.

Figure 2:
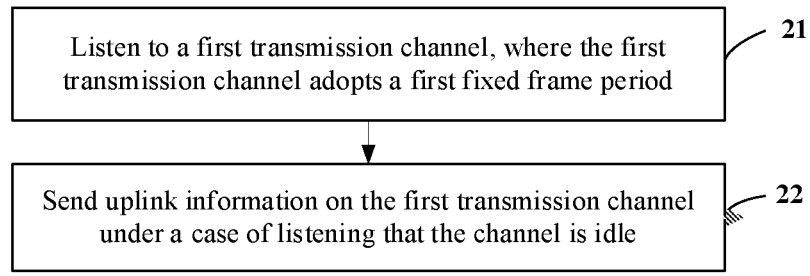
FIG. 2 is a flow diagram of an unlicensed band information transmission method at a terminal side according to an embodiment of the present disclosure.

An embodiment of the present disclosure provides an unlicensed band information transmission method, applied to a terminal. As shown in FIG. 2, the method includes the following steps:

Step 21: Listen to a first transmission channel, where the first transmission channel adopts a first fixed frame period.

Where the terminal in the embodiment of the present disclosure may be FBE equipment, a value set of a fixed frame period supported by the terminal may be pre-configured by a device manufacturer, for example, the supported fixed frame period is required to be within the scope of 1-10 ms. Where the terminal may start transmission at a starting moment of some fixed frame period, the terminal may also change the currently applied fixed frame period, but the change frequency cannot be more than once every 200 ms.

Where the first transmission channel adopting the first fixed frame period may be: the first transmission channel adopts a frame structure of the first fixed frame period. Before the starting moment of the first fixed frame period (or referring to as before the start of transmission), the terminal may execute LBT, such as a clear channel assess (CCA). It is worth pointing out that the terminal may adopt a specific category for listening to the first transmission channel. The category includes, but is not limited to category 1, category 2 and category 4. LBT of the category 1 is the terminal without performing LBT, and can be also referred to as immediate transmission. LBT of the category 2 is one-shot LBT, namely, the terminal performs one-shot LBT (namely, one-shot CCA) before the transmission. If the channel is idle, the transmission is performed; and if the channel is busy, the transmission is not performed. LBT of the category 4 is a channel access mechanism based on back-off. While the terminal listens that the channel is busy, back-off can be performed; and the listening is performed continuously until detecting that the channel is idle, then the transmission can be performed. Optionally, the terminal in an embodiment of the present disclosure adopts, but is not limited to, one of the foregoing categories for performing channel listening.

Step 22: Send uplink information on the first transmission channel while detecting that the channel is idle.

Where if the channel is judged to be idle while the terminal performs CCA, the information may be sent within a following first fixed frame period. Taking the category 2 as an example, listening is performed on the first transmission channel at a position where the terminal is immediately before the time domain starting position of the first fixed frame period. If the channel is judged to be busy while the terminal performs CCA, transmission is not allowed within the following first fixed frame period. Where in the embodiment of the present disclosure, the position immediately before the time domain starting position of the following first fixed frame period may refer to a position of the terminal performing CCA in FIG. 3. This position is adjacent to the first fixed frame period, and before the start of the first fixed frame period.

In one embodiment of the present disclosure, the terminal may receive downlink information on a second transmission channel, where the second transmission channel adopts a second fixed frame period. It means herein that a network device corresponds to the second fixed frame period, or the terminal adopts the second fixed frame period to receive information. Where the second fixed frame period may be the same as the first fixed frame period, and the same herein means that the duration of the second fixed frame period is the same as that of the first fixed frame period. In addition, the second fixed frame period may be different from the first fixed frame period, and the difference herein means that the duration of the second fixed frame period is different from that of the first fixed frame period. It is worth pointing out that the embodiments of the present disclosure do not limit a frame structure specifically, for example, while the duration of the second fixed frame period is the same as that of the first fixed frame period, the frame structure of the second fixed frame period may be the same or different from that of the first fixed frame period.

Figure 3:
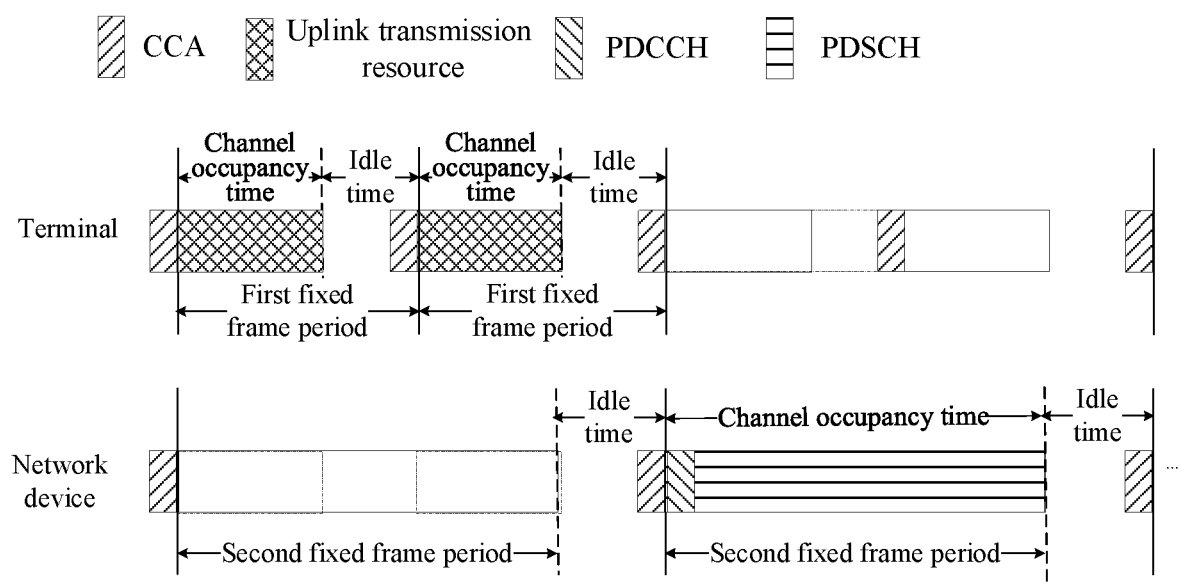
FIG. 3 is a schematic diagram of resource mapping of a first fixed frame period and a second fixed frame period according to an embodiment of the present disclosure.

In the embodiments of the present disclosure, the fixed frame period may be configured to the terminal flexibly. At this time, the fixed frame periods respectively corresponding to the terminal and the network device may be the same or different. A case that the second fixed frame period corresponding to the network device is different from the first fixed frame period corresponding to the terminal is taken as an example. As shown in FIG. 3, the terminal and the network device correspond to the fixed frame periods with different lengths respectively. That is, the fixed frame period of the network device may be different from that of the terminal, or respective fixed frame periods, for sending and receiving, of the network device or the terminal are different. In the embodiments of the present disclosure, the configured fixed frame period is defined from an angle of a sending end, and a corresponding receiving end performs reception based on the fixed frame period of the sending end. As shown in FIG. 3, a dotted portion in the figure is receiving resource. In this way, the fixed frame period can be flexibly configured to the network device and the terminal, thereby reducing unnecessary resource waste and improving resource utilization rate.

Optionally, the method further includes: obtaining at least one of the first fixed frame period or the second fixed frame period. Optionally, while the terminal and the network device correspond to a fixed frame period respectively, the network device may send the fixed frame period corresponding to the terminal and the network device to the terminal, for example, the network device may send at least one of the first fixed frame period or the second fixed frame period to the terminal through a radio resource control (RRC). In addition, the first fixed frame period and the second fixed period may also be predefined, such as defined in the protocol.

Optionally, the method further includes: the terminal reports the first fixed frame period, namely, the terminal sends the fixed frame period corresponding to the terminal to the network device, so that the network device performs reception based on the first fixed frame period.

Further, a 5th generation (5G) mobile communication system, or referred to as a new radio (NR) system needs to adapt to a variety of scenarios and business requirements. The main scenarios of the NR system include an enhanced mobile broadband (eMBB), massive machine type communications (mMTC) and ultra-reliable and low latency communications (URLLC), which put forward requirements of high reliability, low latency, large bandwidth and wide coverage on the system. In the case that there is only one LBT opportunity for UL transmission for each Fixed Frame Period in FBE, if CCA fails to occupy the channel, the whole fixed frame period cannot be used. This will lead to larger latency, and may not meet the low latency requirement of the NR system.

In order to reduce the transmission latency of the NR system under an unlicensed band, the system supports semi-static uplink configured grant transmission so as to reduce a signalling interaction process and ensure the low latency requirement. A configured grant resource may be configured in a semi-statically by a radio resource control (RRC) signalling. While service data comes, the terminal may send data on the configured grant resource (such as a physical uplink shared channel, PUSCH). In addition, for scheduling-based uplink (SUL), while a scheduling latency is longer than the remaining fixed frame period, scheduled data is within the next fixed frame period; however, a time domain starting position of a transmission resource of the scheduled data may not be aligned with that of the fixed fame period, for example, the time domain starting position of the scheduled transmission resource is not at the boundary of the first fixed frame period. In this scenario, step 22 includes: sending uplink information on an uplink transmission resource in a first transmission channel, where the uplink transmission resource is a configured grant resource or a scheduled transmission resource.

Taking a case that the uplink transmission resource is the configured grant resource as an example, the terminal can perform autonomous uplink transmission without the authorization of the network device. Before the transmission, the terminal listens to the first transmission channel; if detecting that the channel is idle, uplink information may be sent on the configured grant resource in the first transmission channel.

In addition, the uplink transmission resource may also be a scheduled transmission resource. Before the transmission, the terminal listens to the first transmission channel; if detecting that the channel is idle, the uplink information may be sent according to DCI information on the scheduled transmission resource in the first transmission channel.

Further, in the embodiments of the present disclosure, the category for listening to the first transmission channel may be LBT of the category 2. That is, in order to keep consistent with a channel access mechanism at the FBE terminal, the terminal in the embodiments of the present disclosure may also adopt LBT of the category 2 for listening to the first transmission channel, for example, the FBE terminal that performs the configured grant transmission adopts an LBT channel access mechanism of the category 2. Specifically, step 21 includes: performing one-shot LBT on the first transmission channel.

Further, in order to ensure that the FEB terminal may perform configured grant transmission or scheduled transmission immediately after CCA, a time domain starting position of the uplink transmission resource in the first transmission channel is aligned with that of the first fixed frame period. For example, for the FBE terminal performing the configured grant transmission, a time domain starting position of the configured grant transmission resource is aligned with that of the first fixed frame period, in this way, the terminal is ensured to perform the configured grant transmission immediately after completing CCA.

Figure 4:
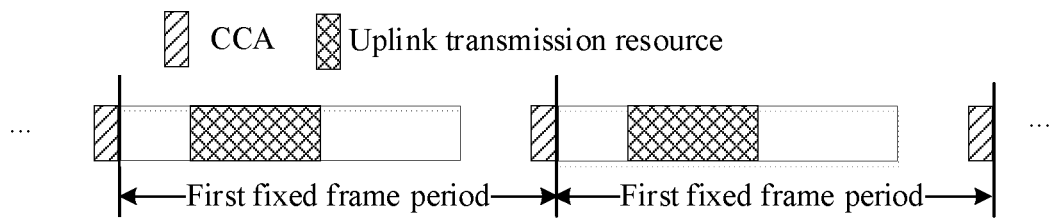
FIG. 4 is a schematic diagram of resource mapping of an uplink transmission resource according to an embodiment of the present disclosure.

In addition, the time domain starting position of the uplink transmission resource in the first transmission channel may be not aligned with that of the first fixed frame period. In this scenario, after the first transmission channel performs CCA, the terminal cannot perform uplink transmission immediately; however, the terminal may send uplink information on the uplink transmission resource based on a first manner. The following further describes the uplink manner in the embodiments of the present disclosure with reference to different manners. As shown in FIG. 4, the time domain starting position of the uplink transmission resource is not aligned with that of the first fixed frame period. While the time domain starting position of the configured grant transmission resource is not aligned with that of the first fixed frame period, or while the network device performs cross frame scheduling on the terminal, the time domain starting position of the scheduling resource on a certain fixed frame period is not aligned with that of the fixed frame period. At this time, if the terminal performs listening before the first transmission channel of the first fixed frame period, the channel is detected to be idle, and the terminal cannot perform transmission immediately. In order to solve this problem, the transmission may be performed through, but not limited to, the following manners.

Manner 1: Send other uplink signals before the time domain starting position of the uplink transmission resource arrives; and send the uplink information on the uplink transmission resource.

Figure 5:
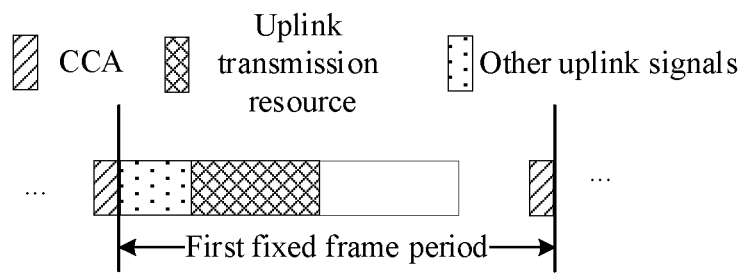
FIG. 5 is a schematic diagram of transmission mapping of a manner 1 according to an embodiment of the present disclosure.

In this manner, while the terminal listens the first transmission channel and confirms that the channel is idle, for example, while the terminal performs listening and confirms that the channel is idle at a position next to the time domain starting position of the first fixed frame period, the terminal may send other uplink signals between the time domain starting position of the first fixed frame period and the time domain starting position of the uplink transmission resource. Other uplink signals herein refer to other signals other than scheduling-free uplink information or scheduling uplink information, such as other uplink data or signalling. As shown in FIG. 5, the terminal performs LBT of the category 2 before the start of the first fixed frame period, namely, performing CCA once. If detecting that the channel is idle, the terminal sends other uplink data or signalling until the uplink transmission resource is started. For example, after the terminal listens that the channel is idle, the terminal sends a sounding reference signal (SRS) firstly to fill unallocated resources until the uplink transmission resource is started.

Manner 2: Perform listening before the time domain starting position of the uplink transmission resource arrives;

while detecting that the channel is idle, the uplink information is sent on the uplink transmission resource.

In this manner, in a case that the terminal listens to the first transmission channel and confirms that the channel is idle, for example, a case that the terminal performs listening and confirms that the channel is idle at a position next to the time domain starting position of the first fixed frame period, the terminal may perform listening firstly before the uplink transmission resource, to ensure that the uplink transmission resource is usable. While detecting that the uplink transmission resource is idle, the uplink information is sent on the uplink transmission resource. Where it is worth pointing out that the manner for listening to the uplink transmission resource includes, but is not limited to:

Listening manner 1: Listen to the first transmission channel continuously before the time domain starting position of the uplink transmission resource arrives.

Figure 6:
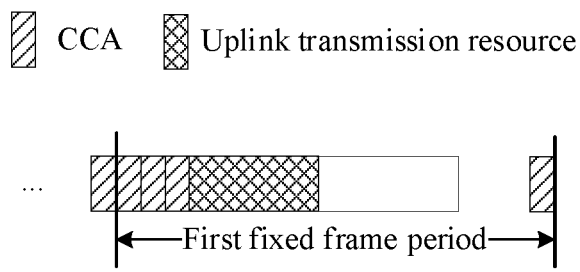
FIG. 6 is a schematic diagram of transmission mapping of a listening manner 1 in a manner 2 according to an embodiment of the present disclosure.

In this manner, in a case that the terminal listens to the first transmission channel and confirms that the channel is idle, for example, a case that the terminal performs listening and confirms that the channel is idle at a position next to the time domain starting position of the first fixed frame period, the terminal may listen continuously between the time domain starting position of the first fixed frame period and the time domain starting position of the uplink transmission resource. As shown in FIG. 6, the terminal performs LBT of the category 2 before the start of the first fixed frame period, namely, performing CCA once. If detecting that the channel is idle, the terminal performs LBT of the category 2 continuously until before the uplink transmission resource of the terminal. Where it is worth pointing out that, in this manner, the terminal performs LBT continuously before the uplink transmission resource; and each LBT indicates that the channel is idle; in this way, the terminal may perform uplink transmission on the uplink transmission resource.

Listening manner 2: Listen to the first transmission channel at a position next to the time domain starting position of the uplink transmission resource.

Figure 7:
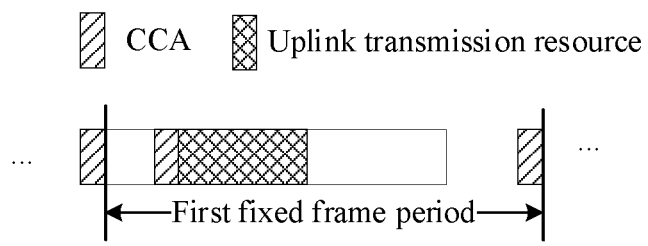
FIG. 7 is a schematic diagram of transmission mapping of a listening manner 2 in a manner 2 according to an embodiment of the present disclosure.

In this manner, in a case that the terminal listens to the first transmission channel and confirms that the channel is idle, for example, a case that the terminal performs listening and confirms that the channel is idle at a position next to the time domain starting position of the first fixed frame period, the terminal may further perform one-shot LBT at a position next to the time domain starting position of the uplink transmission resource. As shown in FIG. 7, the terminal performs LBT of the category 2 before the start of the first fixed frame period, namely, performing CCA once. If detecting that the channel is idle, the terminal may further perform LBT of the category 2 at a position next to the time domain starting position of the uplink transmission resource. If detecting that the channel is idle, the terminal may perform uplink on the uplink transmission resource immediately. Where the embodiments of the present disclosure perform listening at a position next to the time domain starting position of the uplink transmission resource; after the listening is completed, the uplink transmission resource is accessed immediately, where the position next to the time domain starting position of the uplink transmission resource refers to a position for performing CCA in FIG. 7, and this position is adjacent to the uplink transmission resource.

In the manner 2, the terminal drops the uplink transmission resource while detecting that the channel is busy. The detected channel is busy herein may be: for the listening manner 1, if one LBT result indicates that the channel is busy during a continuous listening process, the terminal stops listening and drops the uplink transmission resource, namely, the transmission is not performed in the first transmission channel of the first fixed frame period. For the listening manner 2, if one LBT result indicates that the channel adjacent to the uplink transmission resource is busy, the terminal drops the uplink, namely, the transmission is not performed in the first transmission channel of the first fixed frame period.

Manner 3: Send uplink information on the uplink transmission resource according to indication information of a network device.

In this manner, the uplink is performed in the indication of the network device. Specifically, the manner includes: performing one-shot LBT after receiving the indication information and before the time domain starting position of the uplink transmission resource arrives; and while detecting that the channel is idle, the uplink information is sent on the uplink transmission resource. For example, after receiving the indication information, the terminal performs LBT of the category 2 at a position next to the time domain starting position of the uplink transmission resource. If detecting that the channel is idle, the uplink is performed on the uplink transmission resource.

Further, before the step of sending the uplink information on the uplink transmission resource according to the indication information of the network device, the manner further includes: receiving the indication information, which indicates that the terminal is allowed to share the fixed frame period or COT of the network device. For example, the network device performs LBT of the category 2 before the start of a fixed frame period. While detecting that the channel is idle, the network device indicates that the terminal may share the fixed frame period or COT for transmission.

In the embodiments of the present disclosure, while the time domain starting position of the configured grant transmission resource or scheduled transmission resource is not aligned with a time domain starting edge of a fixed frame period, if performing LBT before the start of the fixed frame period and detecting that the channel is idle, LBT may be further performed before actual transmission, or other signals are sent to fill a gap between an edge of the fixed frame period and the uplink transmission resource, or the transmission is performed according to the indication information of the network device.

In the unlicensed band information transmission method of the embodiments of the present disclosure, the terminal listens to the first transmission channel that adopts the first fixed frame period. While detecting that the channel is idle, information may be sent on the first transmission channel, so that the FBE equipment may perform information transmission on an unlicensed band. In addition, the terminal and the network device correspond to a fixed frame period respectively. The configuration manner is more flexible, thereby reducing unnecessary resource waste and improving resource utilization rate. Further, the terminal may adopt a category which is consistent with the FEB channel access mechanism for performing channel listening.

The foregoing embodiments describe an unlicensed band information transmission method in different scenarios. The following further describes a terminal corresponding to the transmission method with reference to the accompanying drawings.

Figure 8:
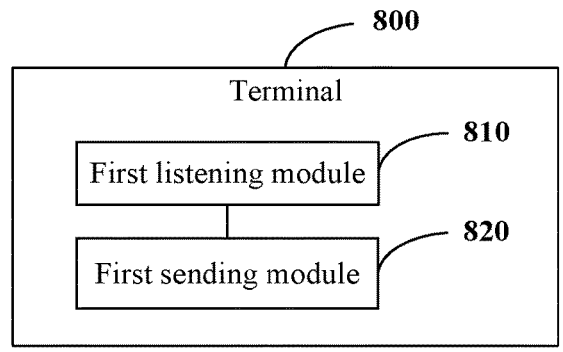
FIG. 8 is a schematic diagram of a module structure of a terminal according to an embodiment of the present disclosure.

As shown in FIG. 8, the terminal 800 in the embodiments of the present disclosure can listen to the first transmission channel in the foregoing embodiments, and the first transmission channel adopts the first fixed frame period. While detecting that the channel is idle, details of an uplink information method is sent on the first transmission channel, and the same effect is achieved. Specifically, the terminal 800 includes the following functional modules:

a first listening module 810, configured to listen a first transmission channel, where the first transmission channel adopts a first fixed frame period; and a first sending module 820, configured to send uplink information on the first transmission channel while detecting that the channel is idle.

The terminal 800 further includes:

a first receiving module, configured to receive downlink information on a second transmission channel, where the second transmission channel adopts a second fixed frame period.

Where the second fixed frame period is different from the first fixed frame period.

The terminal 800 further includes:

an acquiring module, configured to acquire at least one of the first fixed frame period or the second fixed frame period.

The terminal 800 further includes:

a reporting module, configured to report the first fixed frame period.

The first sending module 820 includes:

a first sending submodule, configured to send uplink information on an uplink transmission resource in the first transmission channel, where the uplink transmission resource is a configured grant transmission resource or a scheduled transmission resource.

Where the first listening module 810 includes:

a first listening submodule, configured to perform one-shot LBT on the first transmission channel.

Where the time domain starting location of the uplink transmission resource is aligned with that of the first fixed frame period.

Where the time domain starting location of the uplink transmission resource is not aligned with that of the first fixed frame period.

Where the first sending submodule includes:

a first sending unit, configured to send uplink information on the uplink transmission resource based on a first manner.

Where the first sending unit includes:

a first sending subunit, configured to send other uplink signals before the time domain starting position of the uplink transmission resource arrives;

a second sending subunit, configured to send the uplink information on the uplink transmission resource.

Where the first sending unit further includes:

a listening subunit, configured to perform listening before the time domain starting position of the uplink transmission resource arrives;

a third sending subunit, configured to send the uplink information on the uplink transmission resource while detecting that the channel is idle.

Where the listening subunit is specifically configured to:

listen to the first transmission channel continuously before the time domain starting position of the uplink transmission resource arrives.

Where the listening subunit is specifically configured to:

perform one-shot LBT on the first transmission channel at a position next to the time domain starting position of the uplink transmission resource.

Where the first sending unit further includes:

a dropping subunit, configured to drop the uplink transmission resource while detecting that the channel is busy.

Where the first sending unit further includes:

a fourth sending subunit, configured to send the uplink information on the uplink transmission resource according to indication information of a network device.

Where the fourth sending subunit is specifically configured to:

perform one-shot LBT after receiving the indication information and before the time domain starting position of the uplink transmission resource arrives; and send the uplink information on the uplink transmission resource while detecting that the channel is idle.

The terminal 800 further includes:

a second receiving module, configured to receive indication information, where the indication information indicates that the terminal is allowed to share the fixed frame period or COT of the network device.

It is worth pointing out that the terminal in the embodiments of the present disclosure listens to the first transmission channel adopting the first fixed frame period; and while detecting that the channel is idle, information may be sent on the first transmission channel, so that the FBE equipment may perform information transmission on an unlicensed band. In addition, the terminal and the network device correspond to a fixed frame period respectively. The configuration manner is more flexible, thereby reducing unnecessary resource waste and improving resource utilization rate. Further, the terminal may also adopt a category which is consistent with the FEB channel access mechanism for performing channel listening.

Figure 9:
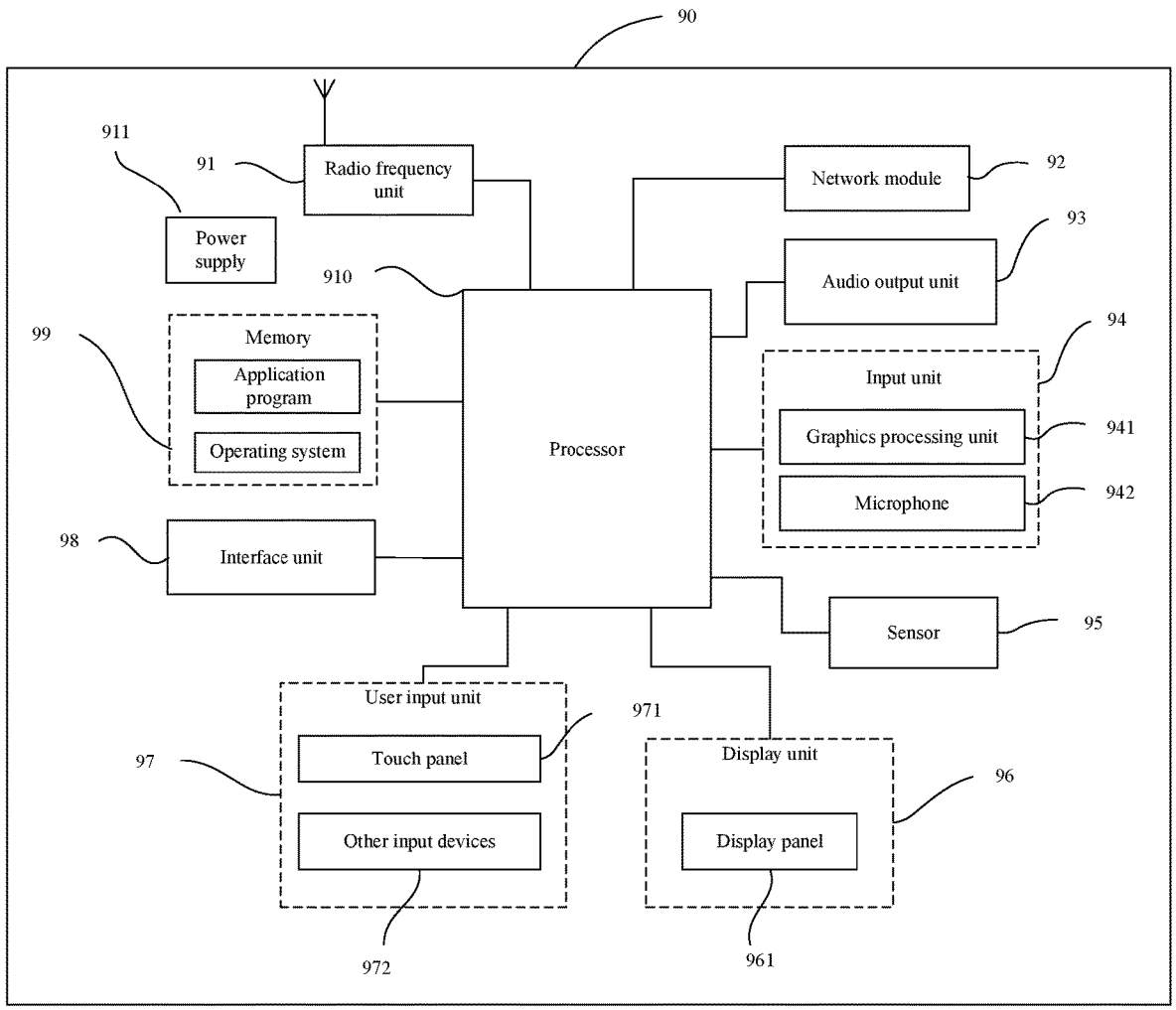
FIG. 9 is a block diagram of a terminal according to an embodiment of the present disclosure.

In order to better implement the above purpose, further, FIG. 9 is a schematic diagram of a hardware structure of a terminal for implementing embodiments of the present disclosure. The terminal 90 includes, but is not limited to a radio frequency unit 91, a network module 92, an audio output unit 93, an input unit 94, a sensor 95, a display unit 96, a user input unit 97, an interface unit 98, a memory 99, a processor 910, a power supply 911 and other components. A person skilled in the art may understand that the structure of the terminal shown in FIG. 9 does not constitute a limitation to the terminal. The terminal may include more or fewer components than those shown in the figure, or some components may be combined, or there may be a different component arrangement. In this embodiment of the present disclosure, the terminal includes, but is not limited to a mobile phone, a tablet personal computer, a notebook computer, a palmtop computer, a vehicle-mounted terminal, a wearable device, a pedometer and the like.

Where the radio frequency unit 91 is configured to listen to a first transmission channel, the first transmission channel adopts a first fixed frame period; and while detecting that the channel is idle, uplink information is sent on the first transmission channel.

The processor 910 is configured to control the radio frequency unit 91 to send and receive data.

The terminal in the embodiments of the present disclosure listens to the first transmission channel adopting the first fixed frame period; and while detecting that the channel is idle, information may be sent on the first transmission channel, so that the FBE equipment may perform information transmission on an unlicensed band. In addition, the terminal and the network device correspond to a fixed frame period respectively. The configuration manner is more flexible, thereby reducing unnecessary resource waste and improving resource utilization rate. Further, the terminal may also adopt a category that is consistent with the FEB channel access mechanism for performing channel listening.

It should be understood that, in the embodiments of the present disclosure, the radio frequency unit 91 may be configured to receive and send information or a signal in a call process. Specifically, after receiving downlink data from a base station, the downlink data is processed by the processor 910; and in addition, uplink data is sent to the base station. Generally, the radio frequency unit 91 includes, but is not limited to an antenna, at least one amplifier, a transceiver, a coupler, a low noise amplifier, a duplexer and the like. In addition, the radio frequency unit 91 may also communicate with another communications device through a wireless communication system and network.

The terminal provides wireless broadband Internet access to a user through the network module 92, for example, helps the user receive and send e-mails, browse web pages, and access streaming media, etc.

The audio output unit 93 may convert audio data received by the radio frequency unit 91 or the network module 92 or stored in the memory 99 into an audio signal, and output the audio signal as a sound. In addition, the audio output unit 93 may further provide an audio output (for example, a call signal received voice, or a message received voice) related to a specific function achieved by the terminal 90. The audio output unit 93 includes a speaker, a buzzer, a telephone receiver, and the like.

The input unit 94 is configured to receive an audio or video signal. The input unit 94 may include a graphics processing unit (GPU) 941 and a microphone 942. The graphics processing unit 941 processes image data of a static image or video obtained by an image capture apparatus (such as a camera) in a video capture mode or an image capture mode. A processed image frame may be displayed on the display unit 96. The image frame processed by the graphics processing unit 941 may be stored in the memory 99 (or another storage medium) or sent through the radio frequency unit 91 or the network module 92. The microphone 942 may receive a sound and can process such sound into audio data. The processed audio data can be converted, in a telephone call mode, into a format that can be sent to a mobile communication base station through the radio frequency unit 91 for output.

The terminal 90 further includes at least one type of sensor 95, such as a light sensor, a motion sensor, and another sensor. Specifically, the light sensor includes an ambient light sensor and a proximity sensor. The ambient light sensor may adjust luminance of the display panel 961 based on brightness of ambient light, and the proximity sensor may close the display panel 961 and/or backlight while the terminal 90 moves to an ear. As a type of motion sensor, an accelerometer sensor may detect an acceleration value in each direction (generally, three axes), and detect a value and a direction of gravity while the accelerometer sensor is static, and may be configured to recognize a terminal posture (such as switching between landscape and portrait modes, a related game, or magnetometer posture calibration), and perform a function related to vibration recognition (such as a pedometer or a knock), and the like. The sensor 95 may further include a fingerprint sensor, a pressure sensor, an iris sensor, a molecular sensor, a gyroscope, a barometer, a hygrometer, a thermometer, an infrared sensor, and the like. Details are not described herein again.

The display unit 96 is configured to display information entered by a user or information provided for a user. The display unit 96 may include a display panel 961. The display panel 961 may be configured in a form of a liquid crystal display (LCD), an organic light-emitting diode (OLED), or the like.

The user input unit 97 may be configured to receive input numeral or character information, and generate a key signal input related to user setting and functional control of the terminal. Specifically, the user input unit 97 includes a touch panel 971 and another input device 972. The touch panel 971 is also referred to as a touchscreen, and may collect a touch operation (such as an operation performed by a user on the touch panel 971 or near the touch panel 971 by using any proper object or accessory, such as a finger or a stylus) performed by a user on or near the touch panel 971. The touch panel 971 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into touch point coordinates, sends the touch point coordinates to the processor 910, and receives and executes a command sent by the processor 910. In addition, the touch panel 971 may be implemented by various types, such as a resistive type, a capacitive type, an infrared type, a surface acoustic wave type, or the like. The user input unit 97 may further include another input device 972 in addition to the touch panel 971. Specifically, the another input device 972 may include but is not limited to a physical keyboard, a functional button (such as a volume control button or a power on/off button), a trackball, a mouse, and a joystick. Details are not described herein.

Further, the touch panel 971 may cover the display panel 961. While detecting the touch operation on or near the touch panel 971, the touch panel 971 transmits the touch operation to the processor 910 to determine a type of a touch event, and then the processor 910 provides a corresponding visual output on the display panel 961 based on the type of the touch event. Although in FIG. 9, the touch panel 971 and the display panel 961 are configured as two independent components to achieve input and output functions of the terminal, in some embodiments, the touch panel 971 and the display panel 961 may be integrated to achieve the input and output functions of the terminal. Details are not limited herein.

The interface unit 98 is an interface for connecting an external apparatus to the terminal 90. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 98 may be configured to receive an input (for example, data information and power) from the external apparatus and transmit the received input to one or more elements within the terminal 90, or may be configured to transmit data between the terminal 90 and the external apparatus.

The memory 99 may be configured to store software programs and various data. The memory 99 may mainly include a program storage area and a data storage area. The program storage area may store an operating system, an application program required by at least one function (such as a voice playing function and an image playing function), and the like, and the data storage area may store data (such as audio data and a phone book) created based on use of a mobile phone, and the like. In addition, the memory 99 may include a high-speed random access memory or a nonvolatile memory, for example, at least one disk storage device, a flash memory, or another volatile solid-state storage device.

The processor 910 is a control center of the terminal, and connects all parts of the entire terminal by using various interfaces and lines. By running or executing a software program and/or a module stored in the memory 99 and invoking data stored in the memory 99, the processor 910 performs various functions of the terminal and data processing, thereby performing overall monitoring on the terminal. The processor 910 may include one or more processing units. Optionally, the processor 910 may be integrated with an application processor and a modem processor. The application processor mainly processes an operating system, a user interface, an application program, and the like, and the modem processor mainly processes wireless communication. It can be understood that the foregoing modem processor may not be integrated into the processor 910.

The terminal 90 may also include a power supply 911 (for example, a battery) that supplies power to various components. Optionally, the power supply 911 may be logically connected to the processor 910 through a power supply management system, thereby achieving functions of managing charging, discharging, and power consumption through the power supply management system.

In addition, the terminal 90 includes some functional modules not shown. Details are not described herein again.

Optionally, an embodiment of the present disclosure further provides a terminal, including a processor 910, a memory 99, and a computer program that is stored in the memory 99 and can run on the processor 910. While executing the computer program, the processor 910 implements the processes of the embodiments of the foregoing unlicensed band information transmission method and a same technical effect can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN), and the wireless terminal may be a mobile terminal, such as a mobile telephone (or referred to as a cellular telephone) and a computer with a mobile terminal. For example, the wireless terminal may a portable mobile apparatus, a pocket mobile apparatus, a handheld mobile apparatus, a computer built-in mobile apparatus or a vehicle-mounted mobile apparatus, which exchange language and/data with a radio access network, for example, a personal communication service (PCS) telephone, a cordless telephone, a session initiation protocol (SIP) telephone, a wireless local loop (WLL) station, a personal digital assistant (PDA) and another device. The wireless terminal may also be referred to as a system, a subscriber unit, a subscriber station, a mobile station, a mobile console, a remote station, a remote terminal, an access terminal, a user terminal, a user agent, or a user device or user equipment. This is not limited herein.

An embodiment of the present disclosure further provides a computer-readable storage medium. The computer-readable storage medium stores a computer program, and while executing the computer program, a processor implements the processes of the embodiments of the foregoing unlicensed band information transmission method and a same technical effect can be achieved. To avoid repetition, details are not described herein again. The computer-readable storage medium includes a read-only memory (ROM), a random access memory (RAM), a magnetic disk, or a compact disc.

The foregoing embodiments introduce the unlicensed band information transmission method of the present disclosure. The following further describes the network device and method with reference to the accompanying drawings.

Figure 10:
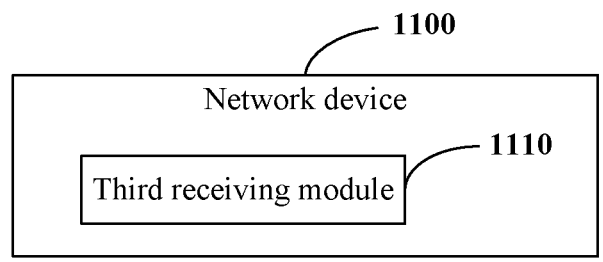
FIG. 10 is a flow diagram of an unlicensed band information transmission method of a network device according to an embodiment of the present disclosure.

As shown in FIG. 10, the unlicensed band information transmission method in the embodiments of the present disclosure is applied to a network device side, and the method includes the following steps:

Step 101: Receive uplink information on a first transmission channel, where the first transmission channel adopts a first fixed frame period.

Where the network device in the embodiments of the present disclosure may be FBE equipment, a fixed frame period supported by the network device is a value in a value set, and the network device may start transmission at a starting moment of a certain fixed frame period.

Where the first transmission channel adopting the first fixed frame period may be: the first transmission channel adopts a frame structure of the first fixed frame period. Before the starting moment of the first fixed frame period (or referred to as starting transmission), the terminal may execute LBT; while LBT judges that the channel is idle, the terminal may send information in the following first fixed frame period. Correspondingly, the network device may receive the information in the first fixed frame period.

Further, while sending information, the network device in the embodiments of the present disclosure further includes the following steps: listening to a second transmission channel; while detecting that the channel is idle, sending downlink information on the second transmission channel, where the second transmission channel adopts a second fixed frame period. Correspondingly, the terminal receives the downlink information on the second transmission channel. Where the network device corresponds to a second fixed frame period, the network device adopts the second fixed frame period to send information; and at the same time, the terminal adopts the second fixed frame period for receiving information. Further, in the embodiments of the present disclosure, a category for listening to the second transmission channel is LBT of the category 2. That is, in order to keep consistent with a channel access mechanism at the FEB terminal, the network device in the embodiments of the present disclosure may also adopt LBT of the category 2 for listening to the second transmission channel.

Where the second fixed frame period may be the same as the first fixed frame period, and the same herein refers to the same duration of the second fixed frame period and the first fixed frame period. In addition, the second fixed frame period may be different from the first fixed frame period, and the difference herein refers to the different duration of the second fixed frame period and the first fixed frame period. In addition, it is worth pointing out that the embodiments of the present disclosure do not limit a frame structure specifically, for example, while the duration of the second fixed frame period is the same as that of the first fixed frame period, the frame structure of the second fixed frame period may be the same or different from that of the first fixed frame period. In the embodiments of the present disclosure, a first fixed frame period may be flexibly configured to the terminal. At this time, the fixed frame periods respectively corresponding to the terminal and the network device may keep consistent or inconsistent. In this way, the network device and the terminal can configure the fixed frame period flexibly, thereby reducing unnecessary resource waste and improving resource utilization rate.

Further, the network device in the embodiments of the present disclosure may execute: sending at least one of the first fixed frame period or the second fixed frame period to the terminal. Optionally, while the terminal and the network device correspond to a fixed frame period respectively, the network device may send the fixed frame period corresponding to the terminal and the network device respectively to the terminal.

Further, the network device further includes: receiving a first fixed frame period. Correspondingly, the terminal reports the first fixed frame period, namely, the terminal sends the fixed frame period corresponding to the terminal to the network device, so that the network device may receive the corresponding fixed frame period based on the first fixed frame period.

Where step 1101 in an embodiment of the present disclosure includes: receiving uplink information on an uplink transmission resource in a first transmission channel, and the uplink transmission resource is a configured grant transmission resource or a scheduled resource. Taking a case that the uplink transmission resource is the configured grant transmission resource as an example, the configured grant transmission resource may be configured to the terminal in a semi-static state through the network device; in this way, while business data comes, the terminal may send data on the configured grant transmission resource without performing another signalling interaction process, thereby reducing data transmission latency.

Further, in order to ensure that the FEB terminal may perform configured grant transmission or scheduling transmission immediately after CCA, a time domain starting position of the uplink transmission resource in the first transmission channel is aligned with that of the first fixed frame period. For example, for the FBE terminal performing the configured grant transmission, a time domain starting position of the configured grant transmission resource is aligned with that of the first fixed frame period, in this way, the terminal is ensured to perform the configured grant transmission immediately after completing CCA.

In addition, the time domain starting position of the uplink transmission resource in the first transmission channel is not aligned with that of the first fixed frame period. For this scenario, after the terminal cannot perform CCA on the first transmission channel, uplink is performed immediately; however, the terminal may send uplink information on the uplink transmission resource based on a first manner. For example, while the time domain starting position of the configured grant transmission resource or scheduled transmission resource is not aligned with a time domain starting edge of a fixed frame period, if performing LBT before the start of the fixed frame period and detecting that the channel is idle, LBT may be performed before actual transmission, or other signals are sent to fill a gap between an edge of the fixed frame period and the uplink transmission resource, or the transmission is performed according to the indication information of the network device.

Where in a case that the terminal performs uplink transmission according to the indication information of the network device, before step 101, the network device further includes: sending the indication information to the terminal while detecting that the channel is idle. The indication information indicates that the terminal is allowed to share the fixed frame period or COT of the network device. Specifically, the network device performs LBT of the category 2 before the start of a fixed frame period. While detecting that the channel is idle, the network device indicates that the terminal may share the fixed frame period or COT for transmission.

In the unlicensed band information transmission method of the embodiments of the present disclosure, the FEB network device may perform information transmission on an unlicensed band. In addition, the terminal and the network device correspond to a fixed frame period respectively. The configuration manner is more flexible, thereby reducing unnecessary resource waste and improving resource utilization rate. Further, the terminal device may adopt a category that is consistent with the FEB channel access mechanism for performing channel listening.

The foregoing embodiments describe an unlicensed band information transmission method in different scenarios respectively. The following further describes a network device corresponding to the transmission method with reference to the accompanying drawings.

As shown in FIG. 11, the network device 1100 in the embodiments of the present disclosure can implement receiving uplink information on a first transmission channel in the foregoing embodiments, where the first transmission channel adopts details of the method of the first fixed frame period, and the same effect is achieved. Specifically, the network device 1100 specifically includes the following functional modules:

a third receiving module 1110, configured to receive uplink information on a first transmission channel, where the first transmission channel adopts a first fixed frame period.

The network device 1100 further includes:
a second listening module, configured to listen to a second transmission channel; and
a second sending module, configured to send downlink information on the second transmission channel while detecting that the channel is idle, where the second transmission channel adopts a second fixed frame period.

Where the second fixed frame period is different from the first fixed frame period.

The network device 1100 further includes:
a third sending module, configured to send at least one of the first fixed frame period or the second fixed frame period to the terminal.

The network device 1100 further includes:
A fourth receiving module, configured to receive a first fixed frame period.

Where the third receiving module includes:
a first receiving submodule, configured to receive uplink information on uplink transmission resource in a first transmission channel, where the uplink transmission resource is a configured grant transmission resource or a scheduled transmission resource.

Where the time domain starting location of the uplink transmission resource is aligned with the time domain starting position of the first fixed frame period.

Where the time domain starting location of the uplink transmission resource is not aligned with the time domain starting position of the first fixed frame period.

The network device 1100 further includes:
a fourth sending module, configured to send indication information to the terminal while detecting that the channel is idle; and the indication information indicates that the terminal is allowed to share the fixed frame period or COT of the network device.

It is worth pointing out that the FEB network device in the embodiments of the present disclosure may perform information transmission on an unlicensed band. In addition, the terminal and the network device correspond to a fixed frame period respectively. The configuration manner is more flexible, thereby reducing unnecessary resource waste and improving resource utilization rate. Further, the network device may also adopt a category that is consistent with the FEB channel access mechanism for performing channel listening.

It should be noted that the division of various modules of the foregoing network device and the terminal is only a division of a logic function; and during actual implementation, all or some of the modules may be integrated into a physical entity, or physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes and executes the functions of the foregoing determining module. The implementations of other modules are similar thereto. In addition, all or some of these modules may be integrated together or implemented independently. The processing element herein may be an integrated circuit having a signal processing capability. During an implementation process, various steps of the foregoing method or the foregoing modules may be completed through an integrated logic circuit of the hardware in the processor element or a command in the form of software.

For example, the foregoing modules can be configured into one or more integrated circuits to perform the foregoing methods, such as: one or more application specific integrated circuits (ASIC), one or more digital signal processors (DSP), one or more field programmable gate arrays (FPGA), or the like. For another example, while one of the foregoing modules is implemented in the form of the processing element invoking a program code, the processing element can be a general-purpose processor, such as a central processing unit (CPU) or another processor that can invoke the program code. For another example, these modules may be integrated together, and implemented in the form of a system-on-a-chip (SOC).

In order to better implement the above purpose, the embodiments of the present disclosure further provide a network device. The network device includes a processor, a memory, a computer program that is stored in the memory and can run on the processor, and while the computer program is executed by the processor, the steps of the foregoing unlicensed band information transmission method are implemented. The embodiments of the present disclosure further provide a computer-readable storage medium, where the computer-readable storage medium stores a computer program, and while the computer program is executed by a processor, the steps of the foregoing unlicensed band information transmission method are implemented.

Figure 12:
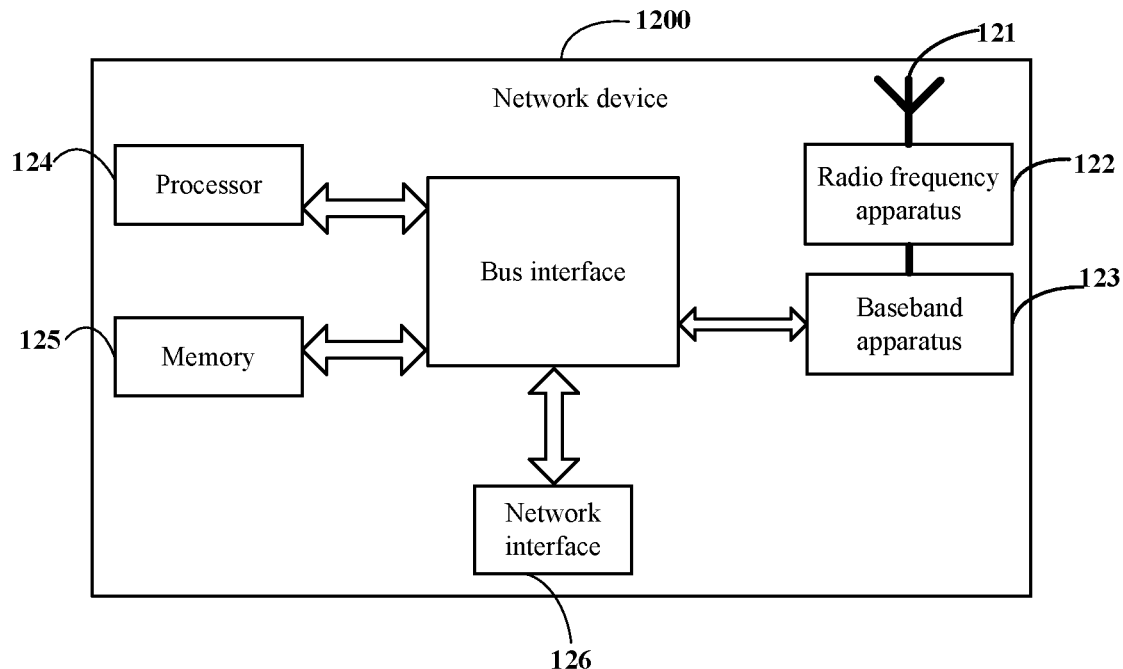
FIG. 12 is a block diagram of a network device according to an embodiment of the present disclosure.

Specifically, the embodiments of the present disclosure further provide a network device. As shown in FIG. 12, the network device 1200 includes an antenna 121, a radio frequency apparatus 122 and a baseband apparatus 123. The antenna 121 is connected to the radio frequency apparatus 122. In an uplink direction, the radio frequency apparatus 122 receives information through the antenna 121, and sends the received information to the baseband apparatus 123 for processing. In a downlink direction, the baseband apparatus 123 processes information to be sent and sends the information to the radio frequency apparatus 122, and the radio frequency apparatus 122 processes the received information and then sends the information through the antenna 121.

The foregoing band processing apparatus may be located in the baseband apparatus 123, and the method performed through the network device in the foregoing embodiment may be implemented in the baseband apparatus 123. The baseband apparatus 123 includes a processor 124 and a memory 125.

The baseband apparatus 123 may include, for example, at least one baseband board, and a plurality of chips are arranged on the baseband board. As shown in FIG. 12, one of the chips is, for example, the processor 124, which is connected to the memory 125, to invoke a program in the memory 125, so as to perform the operations of the network device shown in the foregoing method embodiment.

The baseband apparatus 123 may further include a network interface 126, which is configured to exchange information with the radio frequency apparatus 122. The interface is, for example, a common public radio interface (CPRI).

The processor herein may be a single processor, or may be a collective term for a plurality of processing elements. For example, the processor may be a CPU or an ASIC, or may be one or more integrated circuits that are configured to implement the foregoing method performed by the network device, for example, may be one or more digital signal processors (DSPs), or one or more field programmable gate arrays (FPGAs), etc. The storage element may be one memory or a collective term for a plurality of storage elements.

The memory 125 may be a volatile memory or a non-volatile memory, or may include both a volatile memory and a non-volatile memory. Where the non-volatile memory is a read-only memory (ROM), a programmable ROM (PROM), an erasable PROM (EPROM), an electrically EPROM (EEPROM) or a flash memory. The volatile memory may be a random access memory (RAM), used as an external cache. Through illustrative but not restrictive instructions, RAM with a plurality of forms may be used, for example, a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct rambus RAM (DRRAM). The memory 125 described in this application is intended to include but is not limited to these and any other suitable types of memories.

Specifically, the network device in this embodiment of this disclosure further includes a computer program that is stored in the memory 125 and can run on the processor 124, and the processor 124 invokes the computer program in the memory 125 to perform the method performed by the modules shown in FIG. 11.

Specifically, while being invoked by the processor 124, the computer program may be configured to receive uplink information on a first transmission channel, where the first transmission channel adopts a first fixed frame period.

The network device in the embodiments of the present disclosure may perform information transmission on an unlicensed band, in addition, the terminal and the network device correspond to a fixed frame period respectively, and the configuration manner is more flexible, thereby reducing unnecessary resource waste and improving resource utilization rate. Further, the network device may adopt a category that is consistent with the FEB channel access mechanism for performing channel listening.

A person of ordinary skill in the art may realize that units and algorithm steps of each example described in reference to the embodiments of the present disclosure can be implemented through electronic hardware, or a combination of computer software and the electronic hardware. Whether these functions are performed in a hardware mode or a software mode depends on a specific application and design constraints of the technical solution. A person skilled in the art may use different methods to achieve the described functions for each particular application, but it should not be considered that the implementation goes beyond the scope of the present disclosure.

A person skilled in the art may clearly understand that, for a convenient and simple description, the specific working processes of the system, device and unit described above may refer to a corresponding process in the foregoing method embodiments, and details are not described herein again.

In the embodiments of the application, it should be understood that the disclosed device and method may be implemented in other manners. For example, the embodiment of the device described above is merely an example. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, namely, may be located in one location, or may be distributed on a plurality of network units. Some or all of the units may be selected according to actual needs to achieve the objective of the solutions of the embodiments.

In addition, functional units in each embodiment of this disclosure may be integrated into one processing unit, or each unit may have separate physical existence, or two or more units may be integrated into one unit.

If the function is achieved in the form of software function units and sold or used as independent products, the function may be stored in a computer readable storage medium. Based on such an understanding, the technical solutions of the present disclosure essentially, or the part contributing to the related art, or some of the technical solutions may be implemented in a form of a software product. The computer software product is stored in a storage medium, and includes a plurality of instructions for instructing a computer device (which may be a personal computer, a server, a network device, or the like) to perform all or some of the steps of the methods described in the embodiments of the present disclosure. The foregoing storage medium includes various media capable of storing a program code, such as a U disk, a mobile hard disk, a ROM, a RAM, a magnetic disk and a compact disc.

In addition, it should be noted that, in the device and method of the present disclosure, obviously, various components or various steps may be decomposed and/or recombined. These decomposition and/or recombination should be regarded as an equivalent solution of the present disclosure. Moreover, the steps for performing the foregoing series of processing may be performed naturally in a chronological order according to a described sequence, but do not necessarily need to be performed in the chronological order, and some steps may be performed in parallel or independently. A person of ordinary skill in the art can understand that all or any step or component of the method and device in the present disclosure may be implemented through hardware, a firmware, software or a combination thereof in any computing apparatus (including a processor, a storage medium and the like). The step and component can be implemented by a person of ordinary skill in the art through basic programming skills after reading the description of the present disclosure.

Therefore, the purpose of the present disclosure may also be implemented through running a program or a group of programs on any computing apparatus. The computing apparatus may be a well-known general-purpose apparatus. Therefore, the purpose of the present disclosure may also be implemented only through providing a program product including a program code capable of implementing the method or device. In other words, such a program product also constitutes the present disclosure, and a storage medium storing such a program product also constitutes the present disclosure. Obviously, the storage medium may be any well-known storage medium or any storage medium to be developed in the future. It should be further noted that, in the device and method of the present disclosure, obviously, various components or various steps may be decomposed and/or recombined. These decomposition and/or recombination should be regarded as an equivalent solution of the present disclosure. Moreover, the steps for performing the foregoing series of processing may be performed naturally in a chronological order according to a described sequence, but do not necessarily need to be performed in the chronological order, and some steps may be performed in parallel or independently.

The optional implementations of the present disclosure are described above. It should be noted that a person of ordinary skill in the art may further make some improvements and refinements without departing from the principles described in the present disclosure and these improvements and refinements shall also fall within the protection scope of the present disclosure.

What is claimed is:

1. An unlicensed band information transmission method, performed by a terminal side, wherein the unlicensed band information transmission method comprises:
   listening to a first transmission channel;
   sending uplink information via the first transmission channel when the first transmission channel is detected to be idle, wherein the first transmission channel adopts a first fixed frame period; and
   receiving downlink information via a second transmission channel, wherein the second transmission channel adopts a second fixed frame period,
   wherein the second fixed frame period is different from the first fixed frame period, and
   wherein the method further comprises:
   sending the first fixed frame period to a network device,
   wherein sending the uplink information via the first transmission channel comprises:
   sending the uplink information to the network on an uplink transmission resource in the first transmission channel, wherein the uplink transmission resource is a configured grant transmission resource or a scheduled transmission resource, and wherein a time domain starting position of the uplink transmission resource is aligned with a time domain starting position of the first fixed frame period.

2. The unlicensed band information transmission method according to claim 1, wherein, before listening to the first transmission channel, the method further comprises:
acquiring at least one of the first fixed frame period or the second fixed frame period.

3. The unlicensed band information transmission method according to claim 2, wherein acquiring at least one of the first fixed frame period or the second fixed frame period comprises:
acquiring at least one of the first fixed frame period or the second fixed frame period via a RRC (Radio Resource Control) signaling.

4. The unlicensed band information transmission method according to claim 1, wherein listening to the first transmission channel comprises:
performing one-shot listen before talk (LBT) on the first transmission channel.

5. The unlicensed band information transmission method according to claim 1, wherein sending the uplink information on the uplink transmission resource comprises:
sending other uplink signals before the time domain starting position of the uplink transmission resource arrives; and
sending the uplink information on the uplink transmission resource.

6. The unlicensed band information transmission method according to claim 1, wherein sending the uplink information on the uplink transmission resource based on the first method comprises:
listening before the time domain starting position of the uplink transmission resource arrives; and
sending the uplink information on the uplink transmission resource when the first transmission channel is detected to be idle.

7. The unlicensed band information transmission method according to claim 6, wherein listening before the time domain starting position of the uplink transmission resource arrives comprises:
listening to the first transmission channel continuously before the time domain starting position of the uplink transmission resource arrives.

8. The unlicensed band information transmission method according to claim 6, wherein listening before the time domain starting position of the uplink transmission resource arrives comprises:
performing one-shot LBT on the first transmission channel at a position next to the time domain starting position of the uplink transmission resource.

9. The unlicensed band information transmission method according to claim 6, wherein, after listening before the time domain starting position of the uplink transmission resource arrives, the method further comprises:
dropping the uplink transmission resource while detecting that the first transmission channel is busy.

10. The unlicensed band information transmission method according to claim 1, wherein sending the uplink information on the uplink transmission resource comprises:
sending the uplink information on the uplink transmission resource according to indication information of a network device.

11. A terminal, comprising a processor, a memory, and a computer program stored in the memory and executable by the processor, wherein the computer program, when executed by the processor, causes the processor to implement an unlicensed band information transmission method, the method comprising:
listening to a first transmission channel;
sending uplink information via the first transmission channel when the first transmission channel is detected to be idle, wherein the first transmission channel adopts a first fixed frame period; and
receiving downlink information via a second transmission channel, wherein the second transmission channel adopts a second fixed frame period,
wherein the second fixed frame period is different from the first fixed frame period, and
wherein the method further comprises:
sending the first fixed frame period to a network device,
wherein sending the uplink information via the first transmission channel comprises:
sending the uplink information to the network on an uplink transmission resource in the first transmission channel, wherein the uplink transmission resource is a configured grant transmission resource or a scheduled transmission resource, and wherein a time domain starting position of the uplink transmission resource is aligned with a time domain starting position of the first fixed frame period.

12. A non-transitory computer-readable storage medium, storing a computer program that, when executed by a processor executes, causes the processor to implement an unlicensed band information transmission method, the method comprising:
listening to a first transmission channel;
sending uplink information via the first transmission channel when the first transmission channel is detected to be idle, wherein the first transmission channel adopts a first fixed frame period; and
receiving downlink information via a second transmission channel, wherein the second transmission channel adopts a second fixed frame period,
wherein the second fixed frame period is different from the first fixed frame period, and
wherein the method further comprises:
sending the first fixed frame period to a network device,
wherein sending the uplink information via the first transmission channel comprises:
sending the uplink information to the network on an uplink transmission resource in the first transmission channel, wherein the uplink transmission resource is a configured grant transmission resource or a scheduled transmission resource, and wherein a time domain starting position of the uplink transmission resource is aligned with a time domain starting position of the first fixed frame period.

13. The terminal according to claim 11, wherein, before listening to the first transmission channel, the method further comprises:
acquiring at least one of the first fixed frame period or the second fixed frame period.

14. The terminal according to claim 13, wherein acquiring at least one of the first fixed frame period or the second fixed frame period comprises:
acquiring at least one of the first fixed frame period or the second fixed frame period via a RRC (Radio Resource Control) signaling.

* * * * *